(12) United States Patent
Kashihara

(10) Patent No.: US 8,215,355 B2
(45) Date of Patent: Jul. 10, 2012

(54) PNEUMATIC TIRE

(75) Inventor: Naoto Kashihara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 408 days.

(21) Appl. No.: 12/561,292

(22) Filed: Sep. 17, 2009

(65) Prior Publication Data

US 2010/0084068 A1  Apr. 8, 2010

(30) Foreign Application Priority Data

Oct. 3, 2008 (JP) ................................ 2008-258624

(51) Int. Cl.
*B60C 9/18* (2006.01)
*B60C 9/28* (2006.01)

(52) U.S. Cl. ........ 152/526; 152/534; 152/535; 152/537; 152/538

(58) Field of Classification Search .................. None
See application file for complete search history.

(56) References Cited

U.S. PATENT DOCUMENTS 4,387,758 A * 6/1983 Matsuda et al. ............... 152/454
2007/0193670 A1  8/2007 Kashihara

FOREIGN PATENT DOCUMENTS

| JP | 2000-168311 | * | 6/2000 |
|---|---|---|---|
| JP | 2003-48111 | | 2/2003 |
| JP | 2004-203298 | * | 7/2004 |
| JP | 2006-306151 | * | 11/2006 |
| JP | 2007-84035 | | 4/2007 |

OTHER PUBLICATIONS

Machine translation of JP 2006-306151, Ogawa, Y., 2006.*
Machine translation of JP 2004-203298, Furuya, S., 2004.*

* cited by examiner

*Primary Examiner* — Justin Fischer
(74) *Attorney, Agent, or Firm* — Fish & Richardson P.C.

(57) ABSTRACT

A pneumatic tire has a belt arranged in such a manner that cords are inclined with respect to a tire circumferential direction. A quarter portion is set to a portion which is between 50 to 80% of a belt width around a tire equator line, a center portion is set to a portion which is inside than the quarter portion, and a shoulder portion is set to a portion which is outside than the quarter portion. A relation $\theta c > \theta s > \theta q$ is satisfied on the assumption that a cord angle in the quarter portion is set to $\theta q$, a cord angle in the center portion is set to $\theta c$, and a cord angle in the shoulder portion is set to $\theta s$, with regard to the cord angle of the belt with respect to the tire circumferential direction.

7 Claims, 5 Drawing Sheets

PNEUMATIC TIRE

BACKGROUND OF THE INVENTION

1. Field of the Invention

The present invention relates to a pneumatic tire provided with a belt arranged in such a manner that cords are inclined with respect to a tire circumferential direction.

2. Description of the Related Art

As an internal structure of a pneumatic tire used in a heavy load vehicle such as a truck, a bus or the like, there has conventionally known a structure in which a reinforcing belt is arranged in an outer peripheral side of a carcass forming a framework of the tire. The belt is generally arranged in such a manner that cords are inclined at a predetermined angle with respect to the tire circumferential direction, and a cord angle is uniform over an entire tire width direction.

However, there is a case that the cord angle is unevenly changed by going through a curing step (Japanese Unexamined Patent Publication No. 2007-84035). This means that the cord angle of the belt with respect to the tire circumferential direction becomes larger in both end portions than in a center portion in the tire width direction, in correspondence to an operation expansion changing the tire so as to bring the tire into close contact with a mold. Accordingly, an end number (a cord number per unit width) becomes smaller and a constraint force tends to be lowered, in both end portions of the belt.

FIG. 7 is a conceptual diagram showing the belt in which the cord angle is changed as mentioned above. Reference symbol C denotes a tire equator line, and reference symbol W denotes a belt width (a half of the belt is illustrated). A broken line is a virtual line in the case that the cord angle is uniform. A cord angle $\theta$ with respect to the tire circumferential direction becomes larger in proportion as being away from the tire equator line C, and becomes maximum at an end portion of the belt. Accordingly, the constraint force of the belt becomes relatively low in the end portion rather than in the center portion.

A pneumatic tire is changed in such a direction that a diameter becomes large, by filling an internal pressure or traveling again and again. This change is called as a diameter growth. If the diameter growth makes progress, a form retention of the tire is deteriorated, and a uniformity is lowered, thereby causing an irregular wear. Accordingly, it is desirable to make the diameter growth as small as possible, and it is important to secure the constraint force of the belt for that purpose.

In order to solve the problem of the diameter growth, there has been proposed a pneumatic tire in which the cord angle of the belt with respect to the tire circumferential direction is set large in a center portion in the tire width direction, set small in both end portions, and set at middle in an intermediate portion (Japanese Unexamined Patent Publication No. 2003-48111). This is structured such as to enhance the constraint force by regulating the cord angle in the periphery of the end portion of the belt, based on the knowledge that the diameter growth is most remarkable in a shoulder portion.

However, in such the tire, it can not be said that a suppressing effect of the diameter growth is sufficient as mentioned below, and it is known that there is still room for improvement. In addition, a strain tends to be increased in the end portion of the belt in which the cord angle is comparatively small, and there is a tendency that a belt durability is lowered. Accordingly, there is desired a pneumatic tire which can achieve an excellent belt durability while further suppressing the diameter growth of the tire.

SUMMARY OF THE INVENTION

The present invention is made in view of the above-mentioned circumstances, and an object of the present invention is to provide a pneumatic tire which can suppress a diameter growth of the tire and is excellent in belt durability.

The inventor of the present invention has devoted himself to make a study again and again for achieving the above-mentioned object, and has found the following matter. Specifically, a growth (a bulge) to an outer side in a tire width direction is small in a side wall portion in which a length of a carcass is comparatively short, at the time of filling a high internal pressure in the tire or traveling again and again, and there is applied a force F drawing a shoulder portion positioned in an outer peripheral side end to an inner side, as shown in FIG. 8. Accordingly, if the diameter growth makes progress, an inner surface shape of the tire becomes convex (large in an inner diameter) to a tire outer peripheral side in a quarter portion, and a tire shape tends to be uneven.

Accordingly, in order to suppress the diameter growth more suitably even though the constraint force of the belt is low in the end portion of the belt, there is known that it is desirable to apply a treatment to the quarter portion rather than the shoulder portion. The suppressing effect of the diameter growth is not sufficient only by making the cord angle of the end portion of the belt small as in the conventional structure, and the problem of the belt durability is generated as mentioned above, in addition to the unstable inner surface shape of the tire. The present invention is devised based on such knowledge, and the above-mentioned object can be achieved by the following structure.

That is, the present invention provides a pneumatic tire comprising a belt arranged in such a manner that cords are inclined with respect to a tire circumferential direction, wherein a quarter portion is set to a portion which is between 50 to 80% of a belt width around a tire equator line, a center portion is set to a portion which is inside in a tire width direction than the quarter portion, and a shoulder portion is set to a portion which is outside in the tire width direction than the quarter portion, wherein a relation $\theta c > \theta s > \theta q$ is satisfied on the assumption that a cord angle in the quarter portion is set to $\theta q$, a cord angle in the center portion is set to $\theta c$, and a cord angle in the shoulder portion is set to $\theta s$, with regard to the cord angle of the belt with respect to the tire circumferential direction.

In the pneumatic tire according to the present invention, the cord angle of the belt with respect to the tire circumferential direction is made minimum in the quarter portion, and the constraint force of the belt becomes the highest in the quarter portion in which the inner surface shape of the tire tends to be locally changed. In addition, the cord angle of the shoulder portion is made smaller than the center portion. In this manner, it is possible to uniformly suppress the diameter growth over the entire tire width direction. Further, since it is possible to set the cord angle of the belt comparatively large in the shoulder portion, it is possible to achieve an excellent belt durability while suppressing an increase of a strain in the end portion of the belt.

In the structure mentioned above, it is preferable that the cord angle of the belt is gradually changed from the quarter portion toward the center portion, while satisfying a relation $\theta c - \theta q \leq 5°$. Accordingly, the cords of the belt tend to be smoothly arranged, and it is possible to suitably secure the strength of the belt. In other words, in the case that a relation θc−θq>5° is set, there is a tendency that it becomes hard to smoothly arrange the cords because the change of the cord angle becomes large, and there is a risk that the strength of the belt is adversely affected by bending the cord.

In the structure mentioned above, it is preferable that the cord angle of the belt is gradually changed from the quarter portion toward the shoulder portion, while satisfying a relation θs−θq≦3°. Accordingly, the cords of the belt tend to be smoothly arranged, and it is possible to suitably secure the strength of the belt. In other words, in the case that a relation θs−θq≦3° is set, there is a tendency that it becomes hard to smoothly arrange the cords because the change of the cord angle becomes large, and there is a risk that the strength of the belt is adversely affected by bending the cord.

The present invention is particularly useful in a tire in which an aspect ratio is not more than 70%. In such a tire having the low aspect ratio, the structure according to the present invention is particularly useful since the length of the carcass in the side wall portion is relatively short, the bulge to the outer side in the tire width direction is suppressed, and the inner surface shape in the quarter portion is significantly changed.

BRIEF DESCRIPTION OF THE DRAWINGS

FIG. 6A shows the related art and FIG. 6B shows the example 1;

DETAILED DESCRIPTION OF THE PREFERRED EMBODIMENTS

Figure 1:
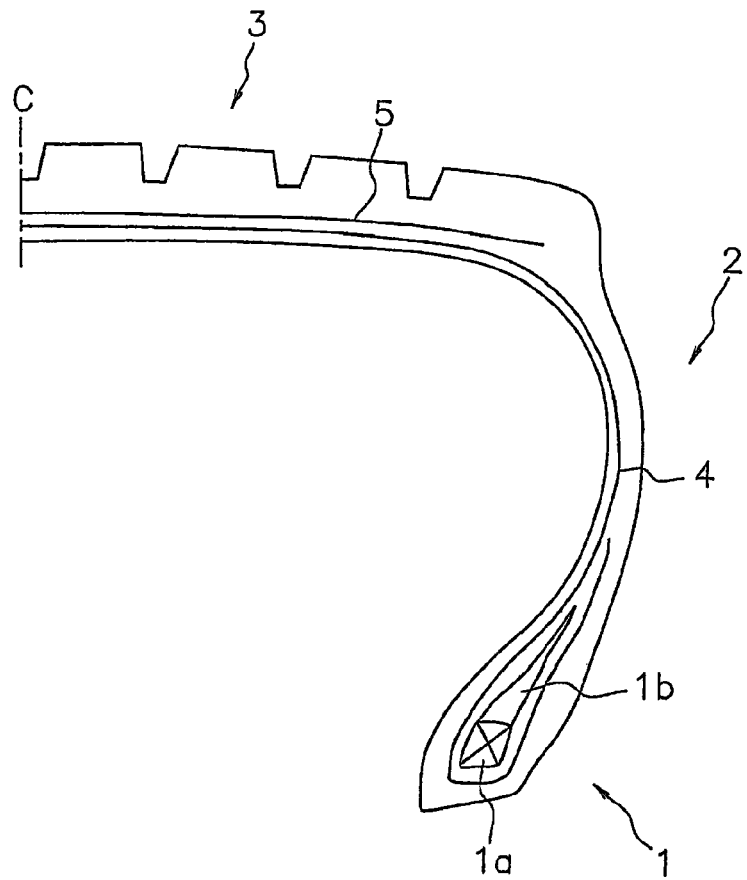
FIG. 1 is a half cross sectional view of a tire meridian schematically showing an example of a pneumatic tire according to the present invention.

An embodiment of the present invention will be explained with reference to the drawings. FIG. 1 is a half cross sectional view of a tire meridian schematically showing an example of a pneumatic tire according to the present invention. The pneumatic tire includes a pair of bead portions 1, sidewall portions 2 extending from the bead portions 1 toward outer peripheral side of the tire respectively, and a tread portion 3 connected to the outer peripheral ends of the sidewall portions 2. In the bead portion 1, an annular bead core 1a formed by coating a convergence body of steel wire with rubber, and a bead filler 1b made of hard rubber.

A carcass 4 is arranged in such a manner as to be bridged between the bead portions 1, and is locked in a state in which an end portion thereof is wound up via the bead core 1a. The carcass 4 is constituted by a cord extending at an angle of about 90° with respect to a tire equator line C, and the cord preferably employs a steel cord, and an organic fiber cord such as a polyester, a rayon, a nylon, an aramid or the like.

A belt 5 is arranged in an outer periphery of the carcass 4 in the tread portion 3, and reinforces the carcass 4 based on a hoop effect. The belt 5 is constituted by a belt ply obtained by topping a number of cords by a rubber, and is arranged in such a manner that the cords are inclined with respect to a tire circumferential direction. A steel cord is exemplified as a cord constituting the belt 5, however, the organic fiber cord as mentioned above can also be used.

Figure 2:
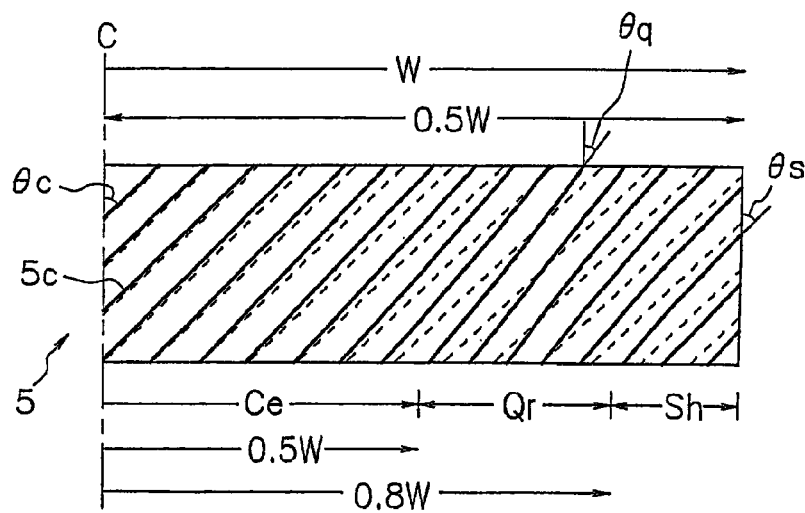
FIG. 2 is a conceptual diagram showing a cord arrangement of a belt.

FIG. 2 conceptually shows an arrangement of the cords constituting the belt 5. Reference symbol W denotes a belt width, and only a half of the belt 5 is shown in FIG. 2. A diagonally extending solid line indicates a cord 5c, and a broken line is a virtual line in the case that the cord angle is assumed to be fixed. A quarter portion Qr is a portion which is between 50 and 80% of the belt width W around the tire equator line C, an inside portion in the tire width direction therefrom is set to a center portion Ce, and an outside portion in the tire width direction is set to a shoulder portion Sh. An end portion of the belt 5 is arranged in the shoulder portion Sh.

In the present invention, assuming that the cord angle in the quarter portion Qr is θq, the cord angle in the center portion Ce is θc, and the cord angle in the shoulder portion Sh is θs, with regard to the cord angle of the belt 5 with respect to the tire circumferential direction, a relation θc>θs>θq is satisfied. In other words, the cord angle (the angle with respect to the tire circumferential direction in the present specification unless otherwise stated) of the belt 5 is set in such a manner as to become minimum in the quarter portion Qr, maximum in the center portion Ce, and medium in the shoulder portion Sh.

Accordingly, the constraint force of the belt 5 becomes the highest in the quarter portion Qr in which the inner surface shape of the tire tends to be locally changed. In addition, the cord angle of the shoulder portion Sh is made smaller than the center portion Ce. In this manner, it is possible to uniformly suppress the diameter growth over the entire tire width direction. Further, since it is possible to set the cord angle of the belt 5 comparatively large in the shoulder portion Sh, it is possible to achieve an excellent belt durability while suppressing an increase of a strain in the end portion of the belt 5.

Figure 3:
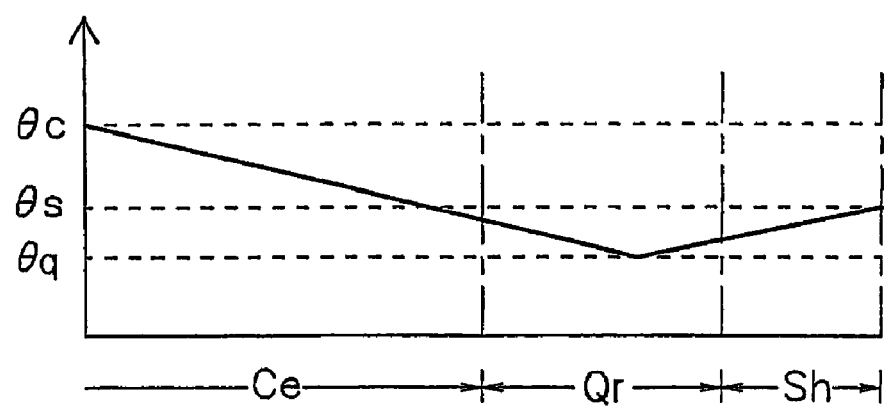
FIG. 3 is a graph showing a transition of a cord angle of a belt.

FIG. 3 is a graph conceptually showing a transition of the cord angle of the belt 5. A horizontal axis indicates a distance in a tire width direction from the tire equator line C, and a vertical axis indicates a cord angle of the belt 5 with respect to a tire circumferential direction. As shown by this graph, the cord angle of the belt 5 becomes gradually smaller from the center portion Ce toward the quarter portion Qr, indicates a minimum value in the quarter portion Qr, and becomes gradually larger from the quarter portion Qr toward the shoulder portion Sh.

In the case that the cord angle is changed in each of the portions as mentioned above, the minimum value of the cord angle in the quarter portion Qr is set to θq, the maximum value of the cord angle in the center portion Ce is set to θc, the maximum value of the cord angle in the shoulder portion Sh is set to θs, and they are set in such a manner as to satisfy the relation θc>θs>θq. In the present embodiment, the value θc can be obtained in the vicinity of the tire equator line C, and the value θs can be obtained in the vicinity of the end portion of the belt 5.

Figure 4:
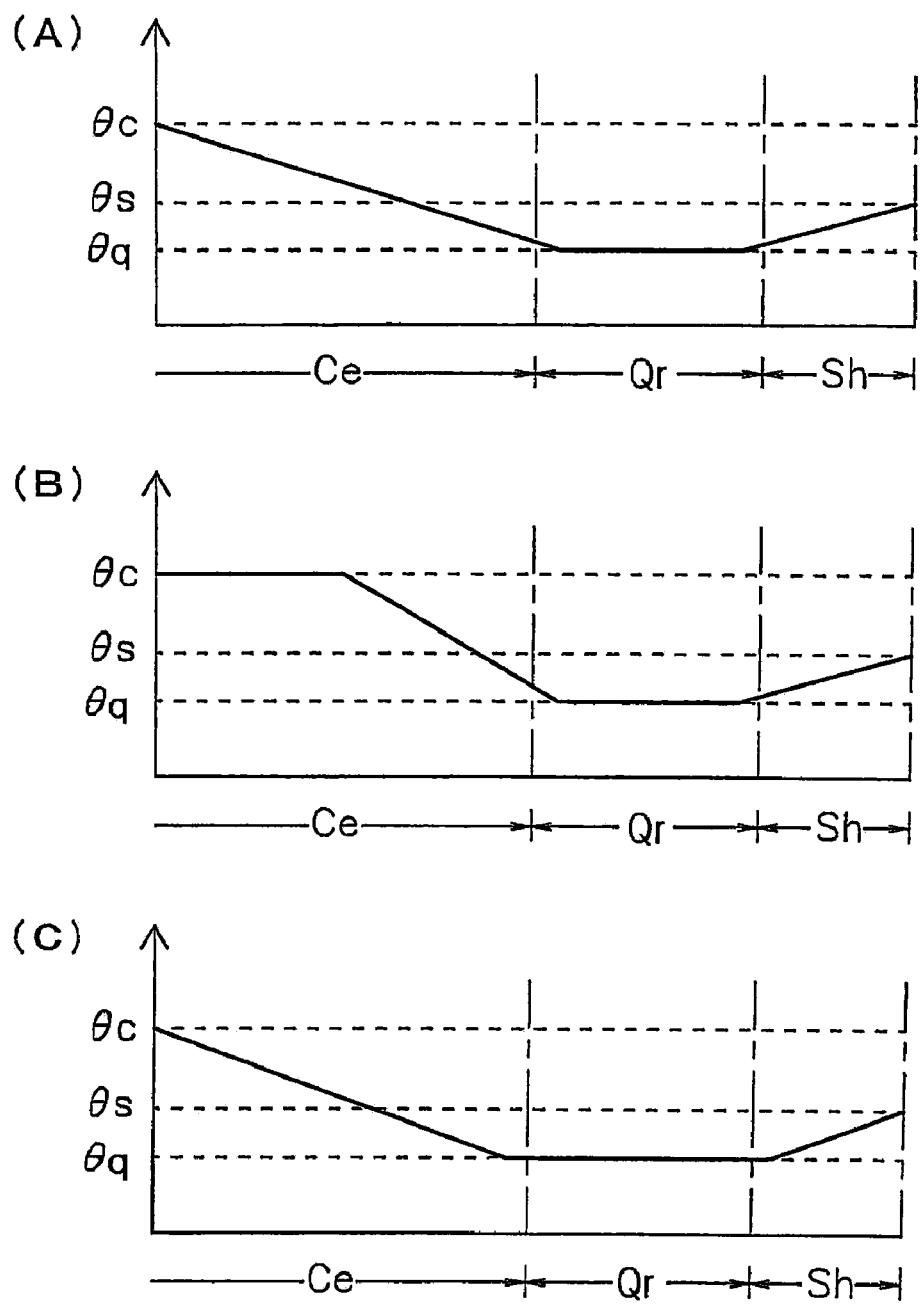
FIGS. 4A to 4C are graphs each showing a transition of a cord angle of a belt in another embodiment of the present invention.

Accordingly, the structure in which the cord angle of the belt undergoes a transition as shown in FIGS. 4A to 4C is included in the present invention. FIG. 4A is an example in which the cord angle becomes uniform in the quarter portion Qr, and FIG. 4B is an example in which the cord angle becomes uniform also in the center portion Ce. FIG. 4C is an example in which the cord angle becomes uniform in the quarter portion Qr, and in the vicinity of the quarter portion Qr in the center portion Ce and the shoulder portion Sh. In any case of FIGS. 4A to 4C, the relation θc>θs>θq is satisfied.

In the present invention, it is preferable that the cord angle of the belt 5 is gradually changed from the quarter portion Qr toward the center portion Ce, while satisfying a relation $\theta c - \theta q \leq 5°$. Accordingly, it is easy to smoothly arrange the cords 5c without bending as shown in FIG. 2, and it is possible to suitably secure a strength of the belt 5. This is particularly useful in the case that the cords 5c are steel cord.

In the present invention, a relation $0° < \theta c - \theta q$ is established, however, a relation $2° < \theta c - \theta q$ is preferable, and a relation $3° \leq \theta c - \theta q$ is more preferable. Accordingly, since the constraint force can be relatively enhanced by reliably making the cord angle in the quarter portion Qr small, it is possible to suppress the diameter growth more uniformly over the entire tire width direction.

Further, in the present invention, it is preferable that the cord angle of the belt 5 is gradually changed from the quarter portion Qr toward the shoulder portion Sh, while satisfying a relation $\theta s - \theta q \leq 3°$. Accordingly, it is easy to smoothly arrange the cords 5c without bending as shown in FIG. 2, and it is possible to suitably secure a strength of the belt 5. This is particularly useful in the case that the cords 5c are steel cord.

In the present invention, a relation $0° < \theta s - \theta q$ is established, however, a relation $1° < \theta s - \theta q$ is preferable, and a relation $2° \leq \theta s - \theta q$ is more preferable. Accordingly, since the constraint force can be relatively enhanced by reliably making the cord angle in the quarter portion Qr small, it is possible to suppress the diameter growth more uniformly over the entire tire width direction.

Further, in the present invention, a relation $1° \leq \theta c - \theta s$ is preferable, and a relation $1.5° \leq \theta c - \theta s$ is more preferable. Accordingly, it is possible to suppress the diameter growth more uniformly over the entire tire width direction by enhancing the constraint force of the belt 5 in the shoulder portion Sh which tends to be lower than the center portion Ce.

FIG. 2 conceptually describes the cord arrangement, however, an actual cord angle is smaller as a whole. Specifically, there is exemplified a structure in which $\theta c$ is between 10 and 30°, $\theta s$ is between 8 and 28°, and $\theta q$ is between 5 and 25°. Further, in the case that the cord 5c has a portion which is gently curved and is not straightly arranged, such as the present embodiment, the cord angle thereof can be measured by utilizing a tangential line.

In FIG. 1, as a matter of convenience for illustration, the belt 5 is described as a single layer member, however, the belt 5 is actually constituted by laminating a plurality of (for example, two or four) belt plies. Each of the belt plies are arranged in such a manner that the cord angle inversely intersects with each other between the plies, and the cord angle satisfies the relation $\theta c > \theta s > \theta q$. In the case that the widths of the belt plies are different from each other, the maximum width of the belt 5 is used as the belt width W.

The setting of the cord angle as mentioned above may be employed in any of a plurality of belt plies constituting the belt, and may be employed in all the belt plies, however, it is preferable that it is employed in the belt ply which serves as a working belt. For example, when the pneumatic tire used in the heavy load vehicle such as the truck, the bus or the like, is provided with a belt formed by laminating four belt plies, it is preferable that the setting of the cord angle is employed in the second and third belt plies serving as the working belt.

The present invention is particularly useful in a tire in which an aspect ratio (height of tire cross section/width of tire cross section×100) is not more than 70%, and is further useful in a tire in which the aspect ratio is not more than 60%. In such a tire having the low aspect ratio, the structure according to the present invention is particularly useful since the length of the carcass 4 in the side wall portion 2 is relatively short, the bulge to the outer side in the tire width direction is suppressed, and the inner surface shape in the quarter portion Qr is significantly changed.

Since the pneumatic tire according to the present invention brings out the excellent belt durability while suppressing the diameter growth based on the operation and effect as mentioned above, it is useful as the heavy load pneumatic tire which is used under a high internal pressure and a high load, and is useful as a super single tire above all. The super single tire is a super flat tire which can set conventional two dual wheel tires to one tire in one side in the truck, the bus or the like.

The pneumatic tire according to the present invention can be manufactured by employing such a modification as to set the cord angle of the belt as mentioned above, and the other tire manufacturing steps are the same as the conventional tire manufacturing steps. The belt as mentioned above can be manufactured by arranging the cords one by one or some by some sequentially and while changing the cord angle, for example, by utilizing a manufacturing apparatus described in Japanese Unexamined Patent Publication No. 2002-127711 filed by the applicant of the present invention.

EXAMPLE

An example tire which concretely shows the structure and effect of the present invention will be explained. An evaluation of each of performances is executed as follows.

(1) Diameter Growth (Inner Surface Stability)

With regard to a tire having a size 445/50R22.5, an inner surface state between states is evaluated by measuring an inner diameter in three states including a rim approach, a new INF and a grown INF. A measured position of the inner diameter is set at intervals of 10 mm in a tire width direction from a tire equator line to an end portion of a belt. In the following Table 1 and FIG. 5, there is described an inner surface change amount (a diameter growth amount) at the time of the grown INF from the rim approach. In this case, Table 1 indicates a value at a representative position of each of the portions, and the representative positions in the center, quarter and shoulder portions are respectively set to the positions at which a distance from the tire equator line with respect to the belt half width becomes 0, 78 and 100%.

In this case, the rim approach indicates a state in which the internal pressure is set to 50 kPa by filling a small amount of air in the rim assembled new tire. Further, the new INF indicates a state in which the internal pressure is set to 830 kPa by further filling (inflating) the air in the tire in the rim approach state. Further, the grown INF indicates a state in which the internal pressure is set to 830 kPa after traveling the tire in the new INF state at 88 km/h for 20000 km on a drum. Results of the evaluation are shown in Table 1 and FIG. 5.

(2) Belt Durability

A traveling distance until any trouble is generated in the belt is evaluated by using the tire having the size 445/50R22.5, and executing a drum travel based on a durability test of ECE54. Results of a related art are set to 100 by an index number, and the greater numerical value indicates the better durability. Results of the evaluation are shown in Table 1.

TABLE 1

|  |  | Example 1 | Example 2 | Comparative example 1 | Comparative example 2 | Comparative example 3 | Comparative example 4 | Related art |
|---|---|---|---|---|---|---|---|---|
| Cord angle (°) | θc | 17 | 17 | 17 | 17 | 17 | 17 | 17 |
|  | θq | 12 | 15 | 12 | 12 | 17 | 18 | 21 |
|  | θs | 15 | 16 | 9 | 18 | 17 | 19 | 22 |
|  | θc − θq | 5 | 2 | 5 | 5 | 0 | −1 | −4 |
|  | θs − θq | 3 | 1 | −3 | 6 | 0 | 1 | 1 |
| Inner surface change amount (mm) | center | 1.6 | 2.0 | 1.6 | 1.8 | 2.4 | 2.8 | 2.8 |
|  | quarter | 1.4 | 1.6 | 0.4 | 1.0 | 3.0 | 3.5 | 5.6 |
|  | shoulder | 0 | 0.8 | −1.5 | 2.0 | 1.6 | 1.8 | 3.4 |
| Belt durability |  | 170 | 150 | 120 | 120 | 140 | 130 | 100 |

Figure 5:
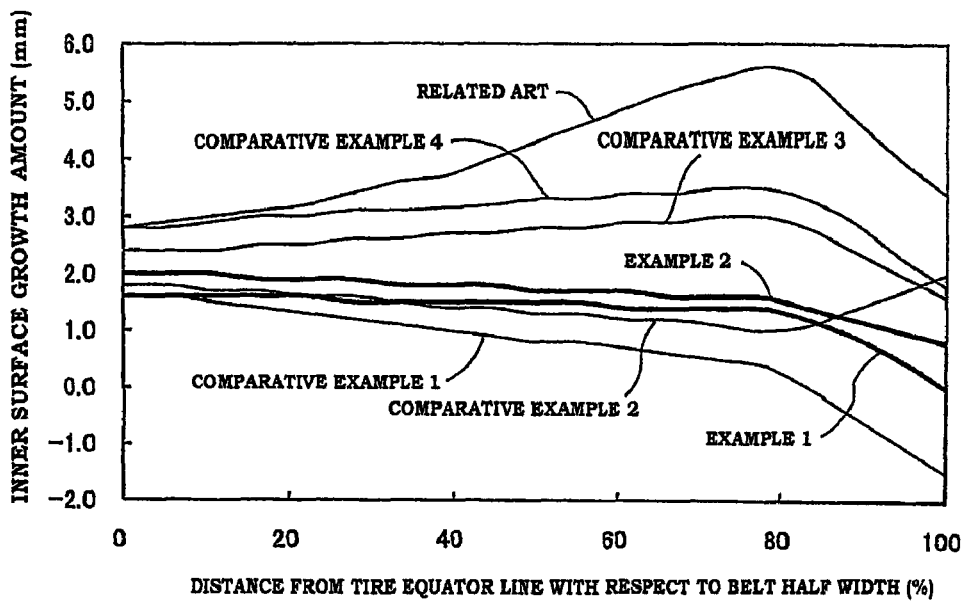
FIG. 5 is a graph showing an inner surface growth amount.

From Table 1 and FIG. 5, it is known that an excellent belt durability is achieved, as well as the diameter growth is suppressed and the inner surface is stable in each of the examples 1 and 2. On the contrary, in the comparative example 1, the shoulder portion is drawn to the inner side, the inner surface is unstable, and the belt durability is low. Further, in the comparative example 2, the diameter growth is great in the shoulder portion, and the belt durability is low. In the comparative examples 3 and 4, the suppressing effect of the diameter growth is small, and in the related art, the suppression of the diameter growth is insufficient and the belt durability is low.

Figure 6:
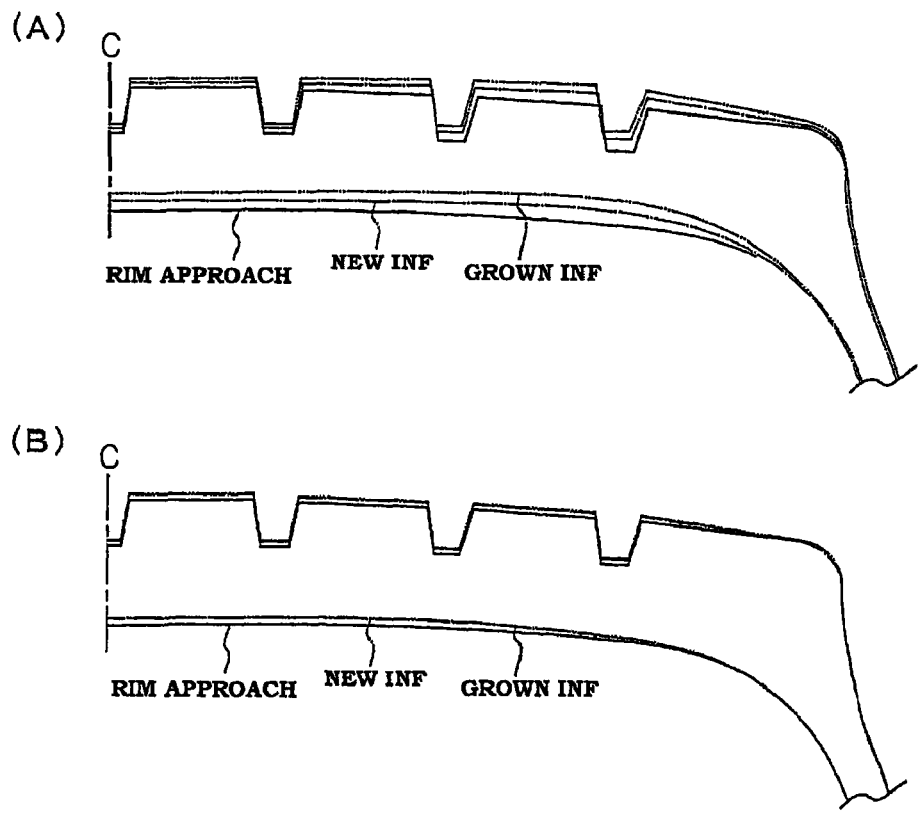
FIGS. 6A and 6B are schematics view showing change of cross sectional shapes of tires, where
Figure 7:
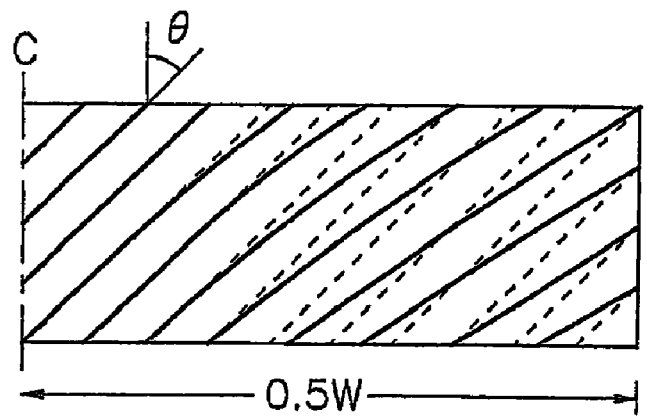
FIG. 7 is a conceptual diagram showing a cord arrangement of a belt in a conventional tire.
Figure 8:
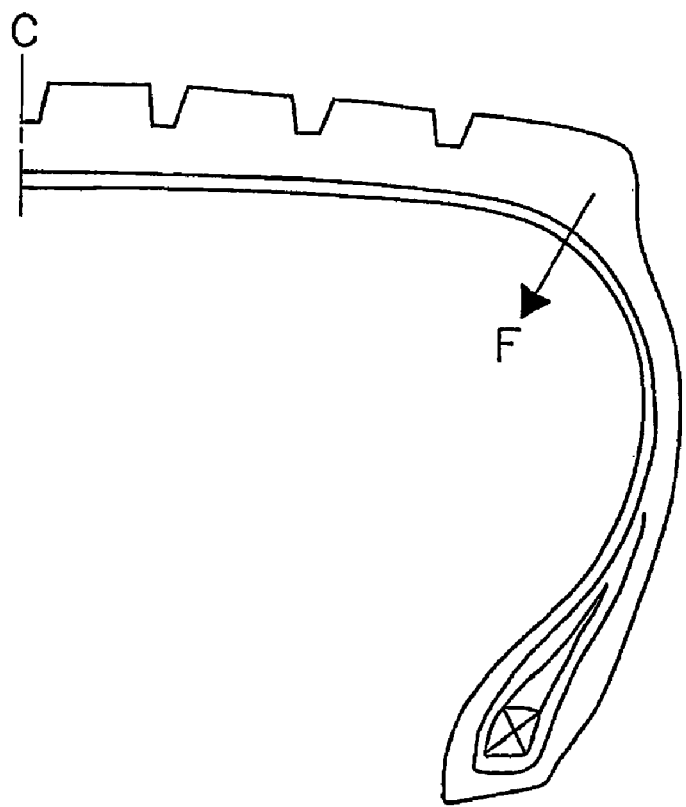
FIG. 8 is a view describing a behavior of a tire in a process of a diameter growth.

FIGS. 6A and 6B are schematics view showing change of cross sectional shapes of the tires, where FIG. 6A shows the related art and FIG. 6B shows the example 1. A solid line shows a state of the rim approach, a one-dot chain line shows a state of the new INF, and a two-dot chain line shows a state of the grown INF.

In the related art, the diameter growth is great over the entire tire width direction, in the process from the rim approach to the new INF, and further in the process from the new INF to the grown INF. On the contrary, in the example 1, the diameter growth is slight in the process from the rim approach to the new INF, and the diameter growth is well suppressed in the process from the new INF to the grown INF, so that the inner surface shape of the tire is stable.

What is claimed is:

1. A pneumatic tire comprising a single belt layer arranged in such a manner that cords are inclined with respect to a tire circumferential direction,
    wherein a quarter portion is set to a portion which extends from 50 to 80% of a belt width around a tire equator line, a center portion is set to a portion which is inside of the quarter portion in a tire width direction, and a shoulder portion is set to a portion which is outside of the quarter portion in the tire width direction, and
    wherein a relation θc>θs>θq is satisfied on the assumption that every cord angle in the quarter portion is identified as an angle θq, every cord angle in the center portion is identified as an angle θc, and every cord angle in the shoulder portion is identified as an angle θs, with regard to the cord angle of the belt with respect to the tire circumferential direction, and not every angle θq is necessarily identical, nor is every angle θc necessarily identical, nor is every angle θs necessarily identical.

2. The pneumatic tire according to claim 1, wherein the cord angle of the belt is gradually changed from the quarter portion toward the center portion, while satisfying a relation θc−θq≦5°.

3. The pneumatic tire according to claim 1, wherein the cord angle of the belt is gradually changed from the quarter portion toward the shoulder portion, while satisfying a relation θs−θq≦3°.

4. The pneumatic tire according to claim 1, wherein an aspect ratio is not more than 70%.

5. A pneumatic tire comprising a belt arranged in such a manner that cords are inclined with respect to a tire circumferential direction,
    wherein a quarter portion is set to a portion which is between 50 to 80% of a belt width around a tire equator line, a center portion is set to a portion which is inside in a tire width direction than the quarter portion, and a shoulder portion is set to a portion which is outside in the tire width direction than the quarter portion,
    wherein a relation θc>θs>θq is satisfied on the assumption that a cord angle in the quarter portion is set to θq, a cord angle in the center portion is set to θc, and a cord angle in the shoulder portion is set to θs, with regard to the cord angle of the belt with respect to the tire circumferential direction, and
    wherein the cord angle of the belt is gradually changed from the quarter portion toward the center portion, while satisfying a relation θc−θq≦5°.

6. The pneumatic tire according to claim 5, wherein the cord angle of the belt is gradually changed from the quarter portion toward the shoulder portion, while satisfying a relation θs−θq≦3°.

7. The pneumatic tire according to claim 5, wherein an aspect ratio is not more than 70%.

* * * * *